US012616090B2

(12) United States Patent
Broge et al.

(10) Patent No.: US 12,616,090 B2
(45) Date of Patent: May 5, 2026

(54) SUSPENSION SYSTEM FOR ELECTRIC POWER EQUIPMENT

(71) Applicant: BRIGGS & STRATTON, LLC, Wauwatosa, WI (US)

(72) Inventors: Michael Broge, Hartford, WI (US); Victor Burgess, Morrisville, NY (US); Derrick Camenga, Sherburne, NY (US); Joshua R. Kowalski, Munnsville, NY (US); Robert S. Laurin, Durhamville, NY (US); Mark J. Melone, Rome, NY (US)

(73) Assignee: BRIGGS & STRATTON, LLC, Wauwatosa, WI (US)

( * ) Notice: Subject to any disclaimer, the term of this patent is extended or adjusted under 35 U.S.C. 154(b) by 680 days.

(21) Appl. No.: 17/965,968

(22) Filed: Oct. 14, 2022

(65) Prior Publication Data

US 2023/0117891 A1 Apr. 20, 2023

Related U.S. Application Data

(60) Provisional application No. 63/256,281, filed on Oct. 15, 2021.

(51) Int. Cl.
*A01D 34/78* (2006.01)
*A01D 34/64* (2006.01)
*A01D 101/00* (2006.01)

(52) U.S. Cl.
CPC ............. *A01D 34/78* (2013.01); *A01D 34/64* (2013.01); *A01D 2101/00* (2013.01)

(58) Field of Classification Search
CPC ........ A01D 34/64; A01D 34/78; A01D 67/00; A01D 69/02; B60G 3/14
See application file for complete search history.

(56) References Cited

U.S. PATENT DOCUMENTS 2,507,980 A * 5/1950 Knapp ................... B60G 11/14
267/248
2,637,592 A * 5/1953 Henning ................ B62D 21/11
180/300
(Continued)

FOREIGN PATENT DOCUMENTS

CN 111559215 A * 8/2020 ............. B60G 13/06
CN 113243190 A * 8/2021 ............. A01D 34/00
(Continued)

OTHER PUBLICATIONS

Trapezoid Definition, Merriam-Webster Online Dictionary, https://www.merriam-webster.com/dictionary/trapezoidal (last visited May 25, 2025).*

(Continued)

*Primary Examiner* — Joseph M Rocca
(74) *Attorney, Agent, or Firm* — Foley & Lardner LLP

(57) ABSTRACT

A zero-turn radius lawnmower includes a chassis having a rear frame, a crossbeam, and a subframe, and a battery receptacle for receiving a battery pack. A first rear suspension cradle is rotatable coupled to the crossbeam on a first end, and is movably coupled to the first side panel on a second end. The first rear suspension cradle supports a first electric motor configured to rotate a first drive wheel supported by the first rear suspension cradle. A second rear suspension cradle is rotatably coupled to the crossbeam on a first end and movably coupled to the second side panel on a second end. The second suspension cradle supports a second electric motor configured to rotate a second drive wheel supported by the second rear suspension cradle. The first rear suspension cradle and the second rear suspension cradle are independently rotatable relative to the rear frame.

16 Claims, 11 Drawing Sheets

(56)                References Cited

U.S. PATENT DOCUMENTS

| | | | | |
|---|---|---|---|---|
| 3,584,856 | A * | 6/1971 | Desbois | B60G 7/005 |
| | | | | 280/124.179 |
| 4,934,733 | A * | 6/1990 | Smith | B60G 3/207 |
| | | | | 280/124.132 |
| 5,326,128 | A * | 7/1994 | Cromley, Jr. | B60G 3/145 |
| | | | | 301/128 |
| 6,244,025 | B1 | 6/2001 | Ferris et al. | |
| 6,447,073 | B1 * | 9/2002 | Goettker | B60B 35/06 |
| | | | | 267/276 |
| 6,588,778 | B1 * | 7/2003 | McLaughlin | B60B 35/04 |
| | | | | 280/124.13 |
| 6,808,033 | B2 * | 10/2004 | Dare-Bryan | B60K 17/22 |
| | | | | 180/24.07 |
| 6,904,988 | B2 * | 6/2005 | Harrup | B60K 7/0007 |
| | | | | 180/65.6 |
| 7,107,746 | B2 * | 9/2006 | Melone | A01D 34/661 |
| | | | | 56/15.8 |
| 7,150,463 | B1 * | 12/2006 | Liao | A61G 5/063 |
| | | | | 280/124.128 |
| 7,270,204 | B2 * | 9/2007 | Taniguchi | B60K 17/043 |
| | | | | 301/6.5 |
| 7,578,116 | B1 * | 8/2009 | Howell | B60K 1/04 |
| | | | | 56/11.9 |
| 7,651,153 | B2 * | 1/2010 | Martin | B60G 17/017 |
| | | | | 180/65.6 |
| 7,686,315 | B2 * | 3/2010 | Kramer | B60K 7/0007 |
| | | | | 180/65.6 |
| 7,908,833 | B2 * | 3/2011 | Nicholson | A01D 34/66 |
| | | | | 56/11.9 |
| 8,720,922 | B2 * | 5/2014 | VanDenberg | B60G 9/003 |
| | | | | 403/348 |
| 8,757,650 | B2 * | 6/2014 | Revelino | B60G 5/01 |
| | | | | 280/684 |
| 9,161,490 | B2 | 10/2015 | Melone et al. | |
| 9,173,346 | B2 * | 11/2015 | Koike | A01D 34/78 |
| 9,597,957 | B2 * | 3/2017 | Weber | A01D 67/00 |
| 9,718,513 | B2 | 8/2017 | Juan et al. | |
| 9,821,689 | B2 | 11/2017 | Busboom et al. | |
| 9,849,776 | B2 * | 12/2017 | Melone | B60K 17/105 |
| 10,005,437 | B2 | 6/2018 | Slegelis et al. | |
| 10,953,715 | B1 * | 3/2021 | Long | B60G 7/006 |

| | | | | |
|---|---|---|---|---|
| 11,032,973 | B2 | 6/2021 | Conrad et al. | |
| 11,376,911 | B2 * | 7/2022 | Friesen | B60G 7/001 |
| 11,427,048 | B1 * | 8/2022 | Long | B60G 7/006 |
| 2003/0116936 | A1 * | 6/2003 | Felsing | B60G 7/02 |
| | | | | 180/6.48 |
| 2010/0207346 | A1 * | 8/2010 | VanDenberg | B60G 11/225 |
| | | | | 267/64.11 |
| 2011/0147108 | A1 | 6/2011 | Hecht et al. | |
| 2011/0272910 | A1 * | 11/2011 | Rezania | B60G 11/22 |
| | | | | 280/124.134 |
| 2013/0291508 | A1 | 11/2013 | Melone et al. | |
| 2013/0291509 | A1 * | 11/2013 | Weber | B60K 17/00 |
| | | | | 56/15.8 |
| 2014/0137528 | A1 * | 5/2014 | Schygge | A01D 34/78 |
| | | | | 180/14.1 |
| 2019/0126708 | A1 * | 5/2019 | Ackermann | B60G 15/06 |
| 2020/0317013 | A1 * | 10/2020 | Friesen | B60G 7/001 |
| 2021/0316785 | A1 * | 10/2021 | Ogura | A01D 34/824 |
| 2022/0176920 | A1 * | 6/2022 | Slegelis | B60T 11/046 |
| 2022/0192095 | A1 * | 6/2022 | Barkey | A01D 34/66 |
| 2023/0105559 | A1 * | 4/2023 | Wang | B60L 58/10 |
| | | | | 180/68.5 |
| 2023/0270044 | A1 * | 8/2023 | Frick | A01D 34/008 |
| | | | | 56/10.2 R |
| 2024/0122101 | A1 * | 4/2024 | Lenfert | A01D 34/78 |

FOREIGN PATENT DOCUMENTS

| | | | | |
|---|---|---|---|---|
| DE | 3633789 A | * | 4/1987 | B60G 3/202 |
| DE | 102019108548 A1 | * | 10/2020 | B60G 7/001 |
| SE | 531918 C2 | * | 9/2009 | B60G 3/14 |
| WO | WO-2021190612 A1 | * | 9/2021 | B60L 1/00 |

OTHER PUBLICATIONS

Ex Parte John A Sazy, Appeal No. 2009-007953, U.S. Appl. No. 10/655,571, TC 3700 (BPAI Jun. 9, 2010).*

Definition of Beam, Oxford Advanced Learner's Dictionary, available at https://www.oxfordlearnersdictionaries.com/us/definition/english/beam_1 (last visited Oct. 11, 2025).*

International Search Report and Written Opinion regarding Application No. PCT/US2022/046692, mail date Feb. 1, 2023, 14 pps.

* cited by examiner

SUSPENSION SYSTEM FOR ELECTRIC POWER EQUIPMENT

CROSS-REFERENCE TO RELATED PATENT APPLICATIONS

This application claims the benefit of and priority to U.S. Provisional Application No. 63/256,281, filed on Oct. 15, 2021, the entire disclosure of which is hereby incorporated by reference herein.

BACKGROUND

Zero-turn radius (ZTR) lawnmowers are a commonly-used type of lawn and garden equipment. ZTR lawnmowers traditionally include two drive wheels and casters that are together able to move the lawnmower in a precise manner that allows for highly-controlled grass cutting operations. ZTR lawnmowers typically have a gasoline-powered engine and hydrostatic transmissions.

SUMMARY

One exemplary embodiment relates to a zero-turn radius lawnmower. The ZTR includes a chassis having a rear frame, a crossbeam, and a subframe. The rear frame includes a first side panel, a second side panel, and a base panel. The first side panel and second side panel are positioned on opposite sides of the base panel and together define a battery receptacle for receiving a removable and rechargeable battery pack. The crossbeam is coupled to and extends between the first side panel and the second side panel. The subframe is coupled to and suspended from the crossbeam, and supports a motor deck and at least two casters. A first rear suspension cradle is rotatable coupled to the crossbeam on a first end, and is movably coupled to the first side panel on a second end. The first rear suspension cradle supports a first electric motor configured to rotate a first drive wheel supported by the first rear suspension cradle. A second rear suspension cradle is rotatably coupled to the crossbeam on a first end and movably coupled to the second side panel on a second end. The second suspension cradle supports a second electric motor configured to rotate a second drive wheel supported by the second rear suspension cradle. Each of the first electric motor and the second electric motor is coupled to the removable and rechargeable battery pack. Each of the first rear suspension cradle and the second rear suspension cradle is independently rotatable relative to the rear frame.

Another embodiment relates to a zero-turn radius lawnmower that includes a rear frame defining a battery receptacle for receiving a removable and rechargeable battery pack, and a crossbeam coupled to the rear frame, a subframe coupled to the crossbeam. The subframe supports a mower deck and at least two casters, and the mower deck includes at least two deck motors to separately drive blades. A first rear suspension cradle is rotatably coupled to the crossbeam on a first end and movably coupled to a first side of the rear frame on a second end. The first rear suspension cradle supports a first electric motor configured to rotate a first drive wheel supported by the first rear suspension cradle. A second rear suspension cradle is rotatably coupled to the crossbeam on a first end and movably coupled to a second side of the rear frame on a second end. The second rear suspension cradle supports a second electric motor config-ured to rotate a second drive wheel supported by the second rear suspension cradle. Each of the at least two deck motors, the first electric motor, and the second electric motor is coupled to the removable and rechargeable battery pack. Each of the first rear suspension cradle and the second rear suspension cradle is independently rotatable relative to the rear frame.

Another embodiment relates to a zero-turn radius lawn-mower that includes a rear frame defining a battery recep-tacle for receiving a removable and rechargeable battery pack, a crossbeam coupled to the rear frame, and a subframe coupled to the crossbeam. The subframe supports a mower deck and at least two casters. A first rear suspension cradle is rotatably coupled to the crossbeam on a first end and movably coupled to a first side of the rear frame on a second end. The first rear suspension cradle supports a first electric motor configured to rotate a first drive wheel supported by the first rear suspension cradle. A second rear suspension cradle is rotatably coupled to the crossbeam on a first end and movably coupled to a second side of the rear frame on a second end. The second rear suspension cradle supports a second electric motor configured to rotate a second drive wheel supported by the second rear suspension cradle. The first electric motor and the second electric motor are coupled to the battery pack and the battery pack is positioned laterally between the first electric motor and the second electric motor. Each of the first rear suspension cradle and the second rear suspension cradle is independently rotatable relative to the rear frame.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
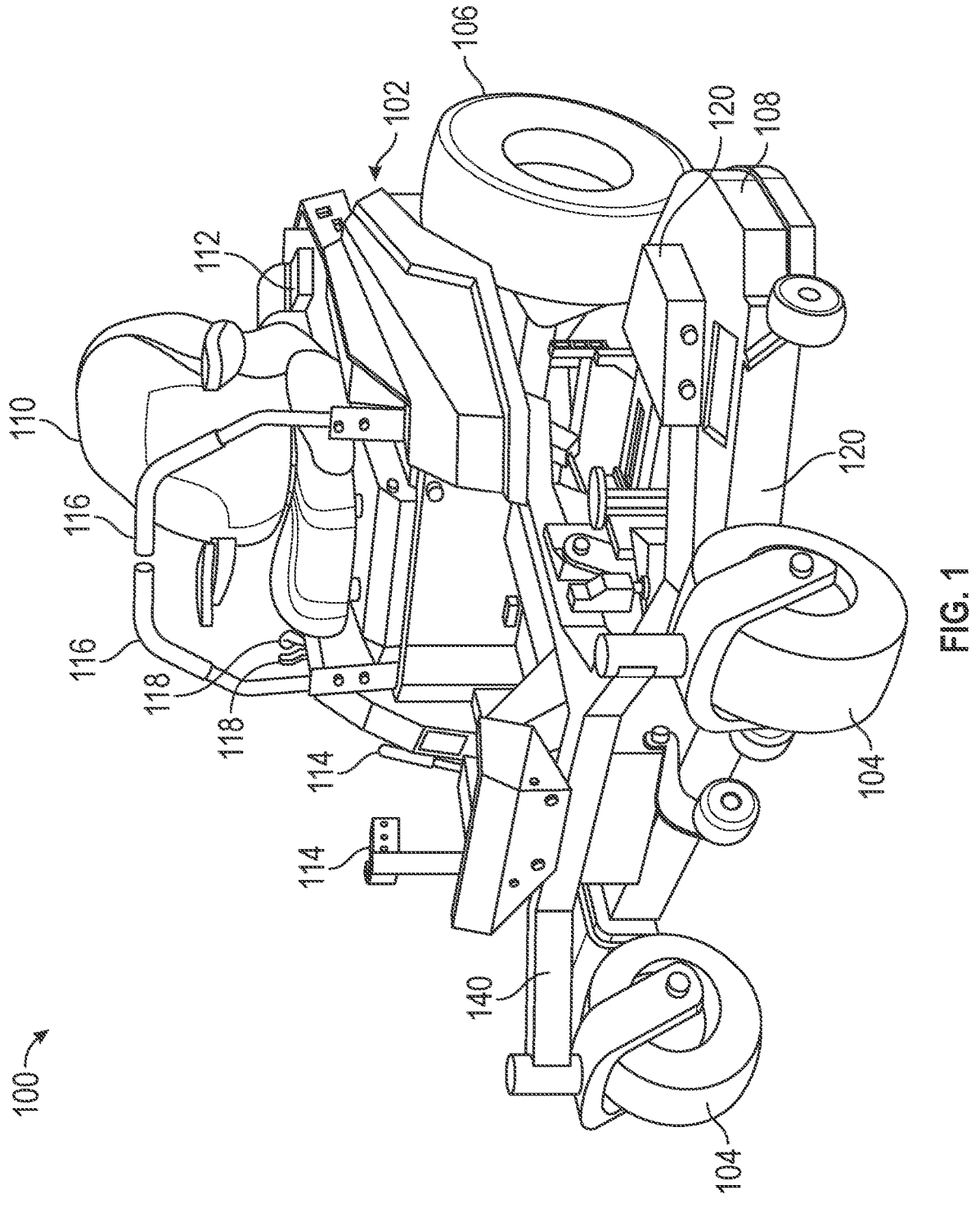
FIG. 1 is a perspective view of a zero-turn radius lawn-mower, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The present disclosure is directed to battery-powered outdoor power equipment or chore products. A "chore product" as used herein refers to any type of equipment, machine, or vehicle that may be used to perform a chore (e.g., an outdoor chore, an indoor chore, lawn care, etc.). For example, a chore product may include a motor, a pump, an actuator, a compressor, and/or another device that is electrically-powered to operate some function of the chore product to facilitate performing a chore. In some embodiments, a chore is a task performed, either by a user or autonomously, at or near a household, a farm, an agricultural facility, a building, a sidewalk, a park, a parking lot, a forest, a field, and/or a lawn. In some embodiments, a chore product transports an operator and performs a chore. In some embodiments, a chore product autonomously operates to perform a chore without an operator being present on the chore product or physically/manually manipulating the chore product.

Referring to the figures generally, the various exemplary embodiments disclosed herein relate to systems, apparatuses, and methods for an electrically-powered zero-turn radius (ZTR) lawnmower. The ZTR has a chassis formed by a rear frame and a subframe that are coupled to one another. The subframe supports a deck that includes one or more motors that drive one or more blades. The rear frame supports two drive wheels, which are each coupled to the rear frame through independent rear suspension cradles. The independent rear suspension cradles are each rotatably coupled to opposite sides of the chassis and are biased into position by spring and damper assemblies that are coupled to the rear frame. The spring and damper assemblies oppose rotation of the rear suspension cradles about the chassis. By including independent suspension cradles and independent spring and damper assemblies, the ZTR is able to provide a smoother riding experience that is able to more readily adapt to undulations in terrain that might otherwise cause the chassis and deck of the ZTR to tilt, which could impact both mowing quality and rider experience. The independent suspension cradles and adjustable spring and damper assemblies can allow for an increased range of motion and a highly-configurable ride experience that allows the ZTR to be optimized to perform specific tasks. The use of individualized electric motors and controllers for each wheel allows for precise controlling and maneuvering of the ZTR.

Although described in the context of a ZTR, the suspension systems described herein can be applicable to other chore products, including outdoor power equipment, indoor power equipment, light vehicles, aerial man lifts, floor care devices, golf carts, lift trucks and other industrial vehicles, recreational utility vehicles, industrial utility vehicles, and lawn and garden equipment. Outdoor power equipment may include lawn mowers, riding tractors, snow throwers, pressure washers, tillers, log splitters, walk-behind mowers, riding mowers, and turf equipment such as spreaders, sprayers, seeders, rakes, and blowers. Outdoor power equipment may, for example, use one or more electric motors to drive an implement, such as a rotary blade of a lawn mower, a pump of a pressure washer, the auger of a snow thrower, the alternator of a generator, and/or a drivetrain of the outdoor power equipment. Indoor power equipment may include floor sanders, floor buffers and polishers, vacuums, etc.

Referring now to FIG. 1, outdoor power equipment, shown as ZTR 100, is provided. The ZTR 100 generally includes a chassis 102 that supports front wheels 104, rear drive wheels 106, and a deck assembly 108. An operator seat 110 is supported by the chassis 102, and is positioned toward the rear of the chassis 102. In some embodiments, and as explained below, the operator seat 110 extends above a battery assembly 112 that powers the ZTR 100. A series of pedals 114 are positioned within a foot space below the operator seat 110, and are configured to receive physical commands from a user to help drive and control the ZTR 100. Two or more handlebars 116 extend upwardly from the chassis 102, toward the operator seat 110. The handlebars 116 can be used to individually and independently control the motors (shown below) that drive the rear drive wheels 106, which allows the ZTR 100 to perform precise and tight turning maneuvers to execute different mowing operations. In some examples, the handlebars 116 include a biasing system to help clock the handlebars 116 relative to the chassis 102. The biasing system can include one or more springs, for examples, that act against movement of the handlebars 116 such that when the handlebars 116 are released, the handlebars 116 return to a home position. In another example, motors and encoders are used to monitor a position of the handlebars 116 and activate to return the handlebars 116 to home position once the detected torque on the motors falls below a threshold value, which indicates that the operator has released the handlebars 116.

In some examples, one or more inputs 118 (e.g., buttons, knobs, handles, etc.) are positioned near the operator seat and configured to selectively activate and/or control the one or more motors 120 positioned on the deck assembly 108 to drive blades (not shown) to cut grass. The inputs 118 can include blade rotation speed controls, which allow a user to more precisely control blade speed at a preferred angular speed. Additional inputs 118 can be provided to adjust a height of the deck assembly 108 relative to the chassis 102 as well.

Figure 2:
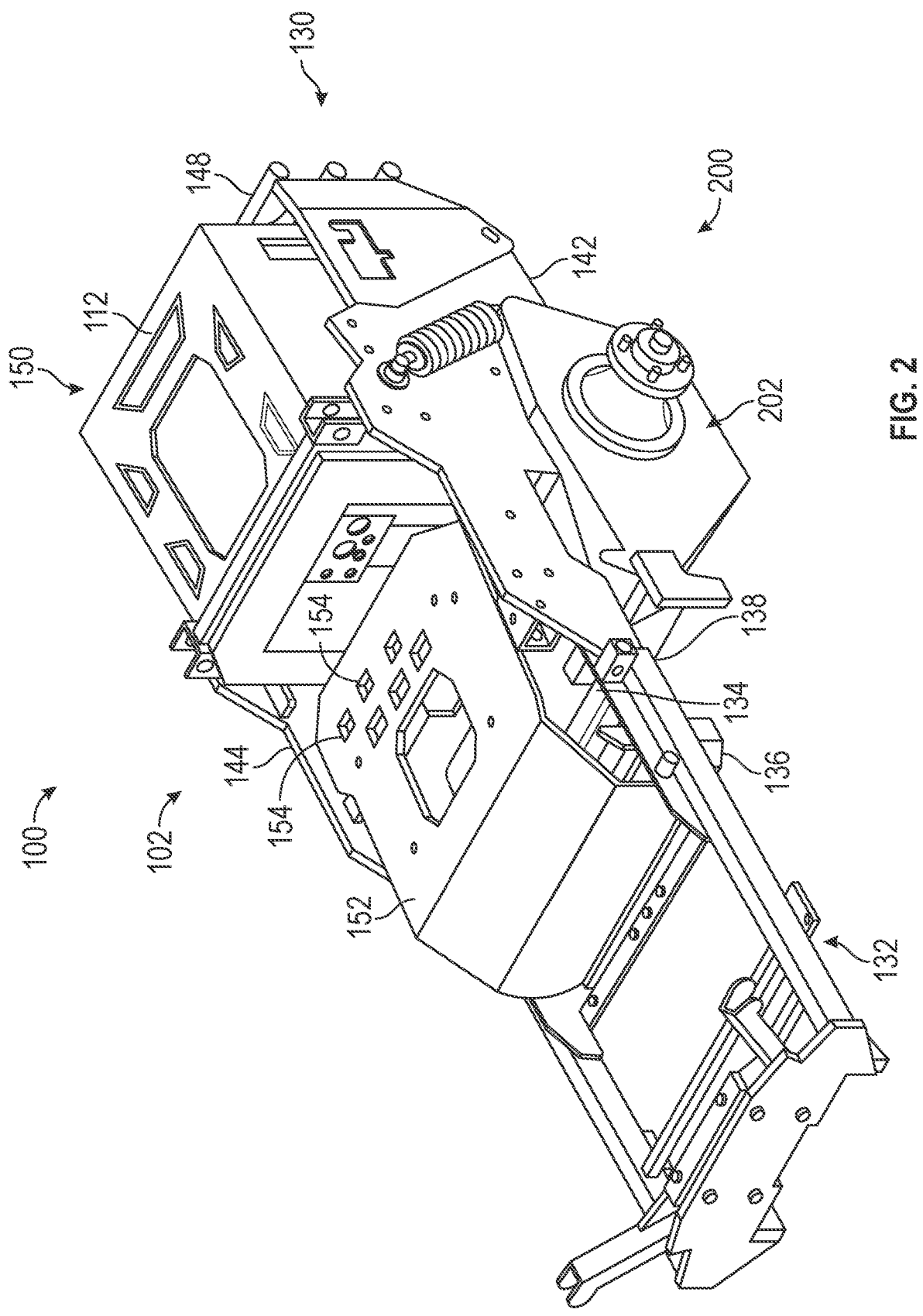
FIG. 2 is a perspective view of a chassis of the zero-turn radius lawnmower of FIG. 1.
Figure 3:
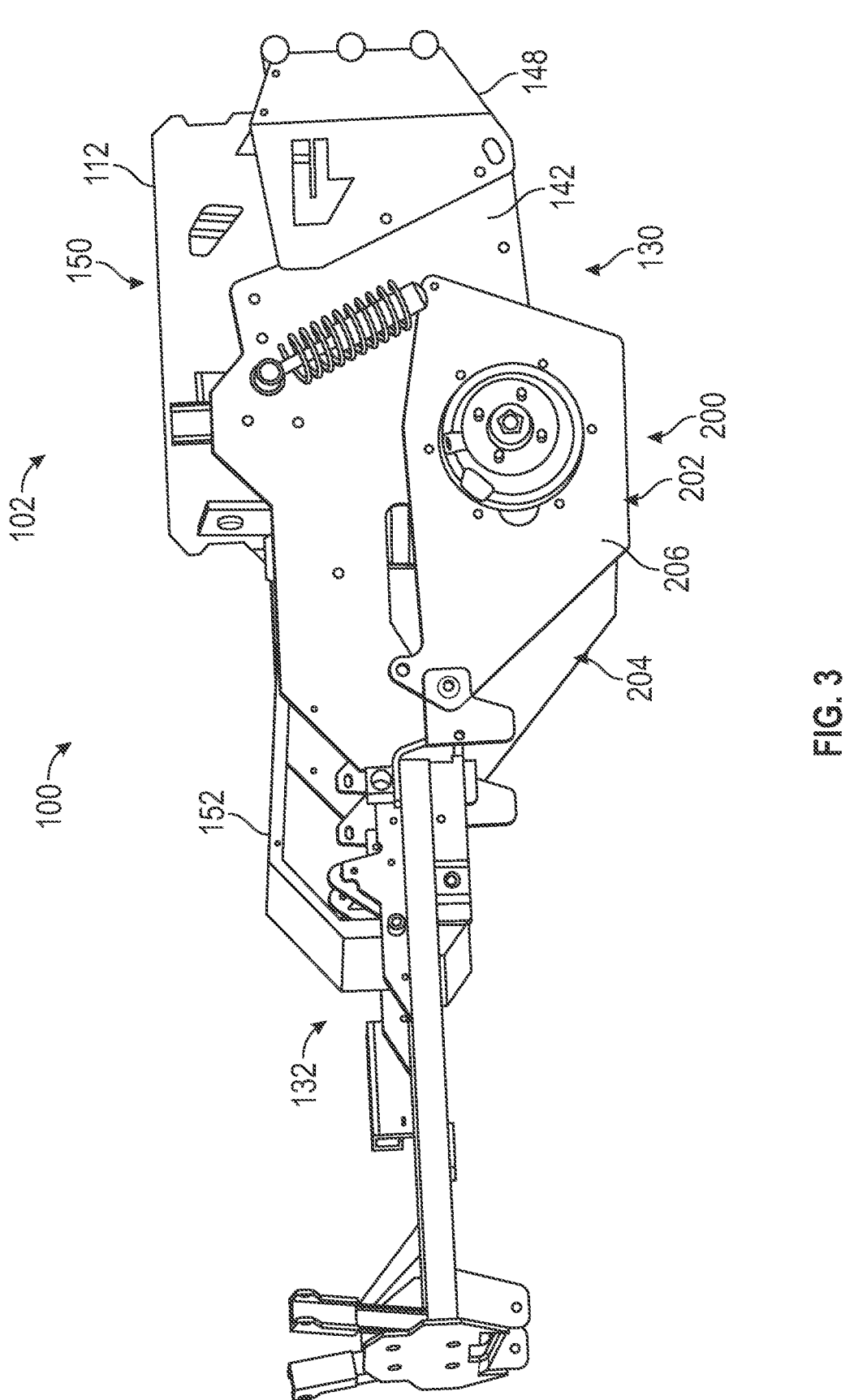
FIG. 3 is a side perspective view of the chassis of FIG. 2, depicting a rear suspension system.
Figure 4:
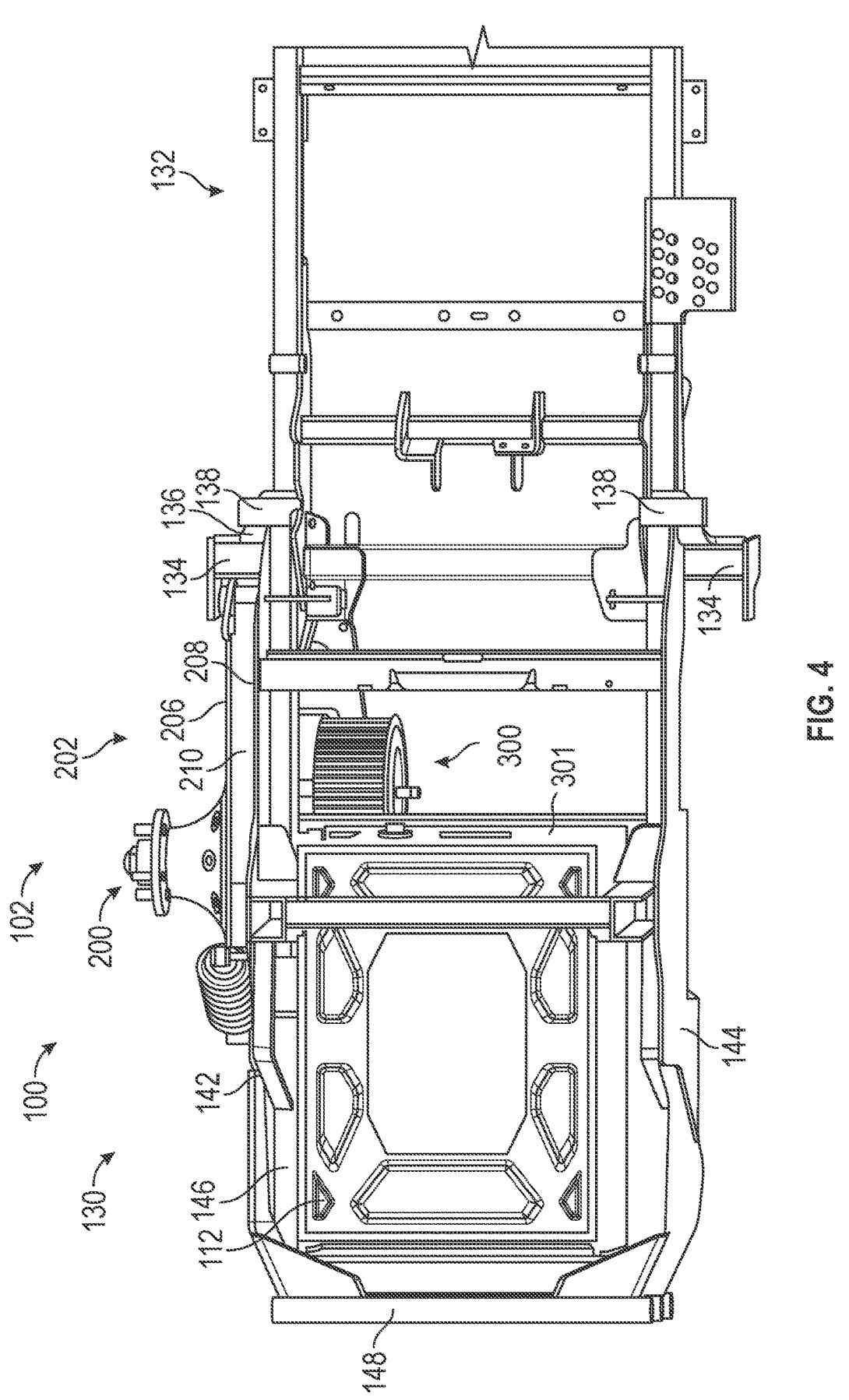
FIG. 4 is a top view of the chassis of FIG. 2, depicting a battery mounting location and a controller tray for powering and operating the zero-turn radius lawnmower of FIG. 1.

With additional reference to FIGS. 2-4, the chassis 102 is shown in additional detail. The chassis generally includes a rear frame 130 and a subframe 132 that are coupled together using one or more crossbeams 134. In some embodiments, a rearward portion of the subframe 132 is coupled to the crossbeam 134 and is cantilevered from the crossbeam 134. The subframe 132 can be rigidly coupled (e.g., welded, adhesively coupled, etc.) to the crossbeam 134 to create a mechanical coupling between the subframe 132 and the rear frame 130. Additional brackets 136 and structural members 138 (e.g., bar stock, box steel or aluminum, channels, etc.) can also be used to reinforce the coupling between the subframe 132 and rear frame 130. The subframe 132 supports a front suspension 140 (shown in FIG. 1) that in turn supports and positions the front wheels 104. The front suspension 140 can take on a variety of different forms, including the various embodiments shown and described within commonly-owned (i) U.S. Patent Application Publication No. 2020/0156467, entitled "Suspension System and Method," filed Sep. 23, 2019, (ii) U.S. Patent Application Publication No. 2020/0180573, entitled "Machine Suspension System," filed Oct. 8, 2019, and (iii) U.S. Patent Application Publication No. 2019/0037769, entitled "Stand-On Mower with an Oscillating Front Axle," filed Aug. 2, 2018, the contents of which are all hereby incorporated by reference in their entireties.

Like the subframe 132, the rear frame 130 is also coupled to the crossbeam 134. The rear frame 130 generally includes two opposing side panels 142, 144, a base panel 146, and a rear cage 148. The opposing side panels 142, 144, base panel 146, and rear cage 148 can be rigidly coupled together (e.g., welded, etc.), bolted, or otherwise fastened together to define a battery receptacle 150. As depicted in FIG. 2, the battery receptacle 150 receives a battery assembly 112. In some examples, the battery assembly 112 is one or more removable and rechargeable battery packs that are coupled together in a parallel configuration. For example, the battery assembly 112 can be formed of one or more battery packs similar to the battery packs shown and described within PCT Patent Application Publication No. WO2021/021874, filed Jul. 29, 2020, and entitled "Battery System and Related Management System," the content of which is hereby incorporated by reference in its entirety. In still other examples, the battery assembly 112 is configured as a fixed battery pack that is formed of several cell module assemblies arranged in a parallel configuration or semi-parallel configuration that is configured to output a voltage between about 24V and about 48V. An example battery pack arranged in this manner is shown and described in commonly-owned PCT Patent Application Publication No. WO2021/113251, filed Dec. 1, 2020, and entitled "Cell Module Assemblies Battery Pack," the content of which is hereby incorporated by reference in its entirety. The battery assembly 112 can include one or more external charging ports (not shown) that allow the battery assembly 112 to be coupled with an external power source, such as a wall socket or utility source, using a plug assembly.

The battery assembly 112 can supply electrical power to each of the motors and controllers on the ZTR 100. As depicted in FIGS. 2 and 4, the chassis 102 can support a tray 152 that receives a plurality of controllers 154 that are each arranged to control a different motor on the ZTR 100. The controller tray 152 can be positioned below a foot panel of the ZTR 100, which extends outwardly away from the rear frame 130 toward the subframe 132 to define a rest area for the feet of an operator. In some examples, each motor on the ZTR 100 has its own dedicated controller 154, and each of the controllers 154 is configured to communicate with one another (e.g., using a CANbus, using a wired connection, using Bluetooth or other wireless protocols) to allow communication throughout the system.

The battery receptacle 150, rear frame 130, and chassis 102, generally, are supported by a rear suspension assembly 200. The rear suspension assembly is generally formed of two independently-mounted rear suspension cradles 202, 204, each of which supports one of the rear drive wheels 106 and their associated drive motors. The rear suspension cradles 202, 204 are coupled to the crossbeam 134 at one end and are coupled to one of the side panels 142, 144 at the opposite end. As explained in additional detail below, the rear suspension cradles 202, 204 are configured to rotate relative to the chassis 102 to help absorb impacts caused by sudden changes in topography or objects along the path of the ZTR 100.

Referring now to FIGS. 2-3 and 5-8, the rear suspension cradles 202, 204 are shown in additional detail. Because the rear suspension cradles 202, 204 are each formed similarly (e.g., having the same or approximately the same dimensions, mirrored or symmetrically), this discussion will focus on the first rear suspension cradle 202. Accordingly, rear suspension cradle 204 and its associated components are omitted from FIGS. 2 and 4-11 to show additional detail of the first rear suspension cable 202 and its associated components but the description herein symmetrically applies to the second rear suspension cradle 204. The first rear suspension cradle 202 and the second rear suspension cradle 204 are independently mounted to the chassis 102 in a way that permits rotation through a finite range (e.g., +/−30 degrees, +/−15 degrees, etc.). In some examples, the allowable range of motion of each rear suspension cradle 202, 204 can be customized depending on the type of job being performed by the ZTR 100, as explained in additional detail below. In some examples, the independent suspension assembly allows for a greater range of motion than traditional rear axle suspensions.

Figure 5:
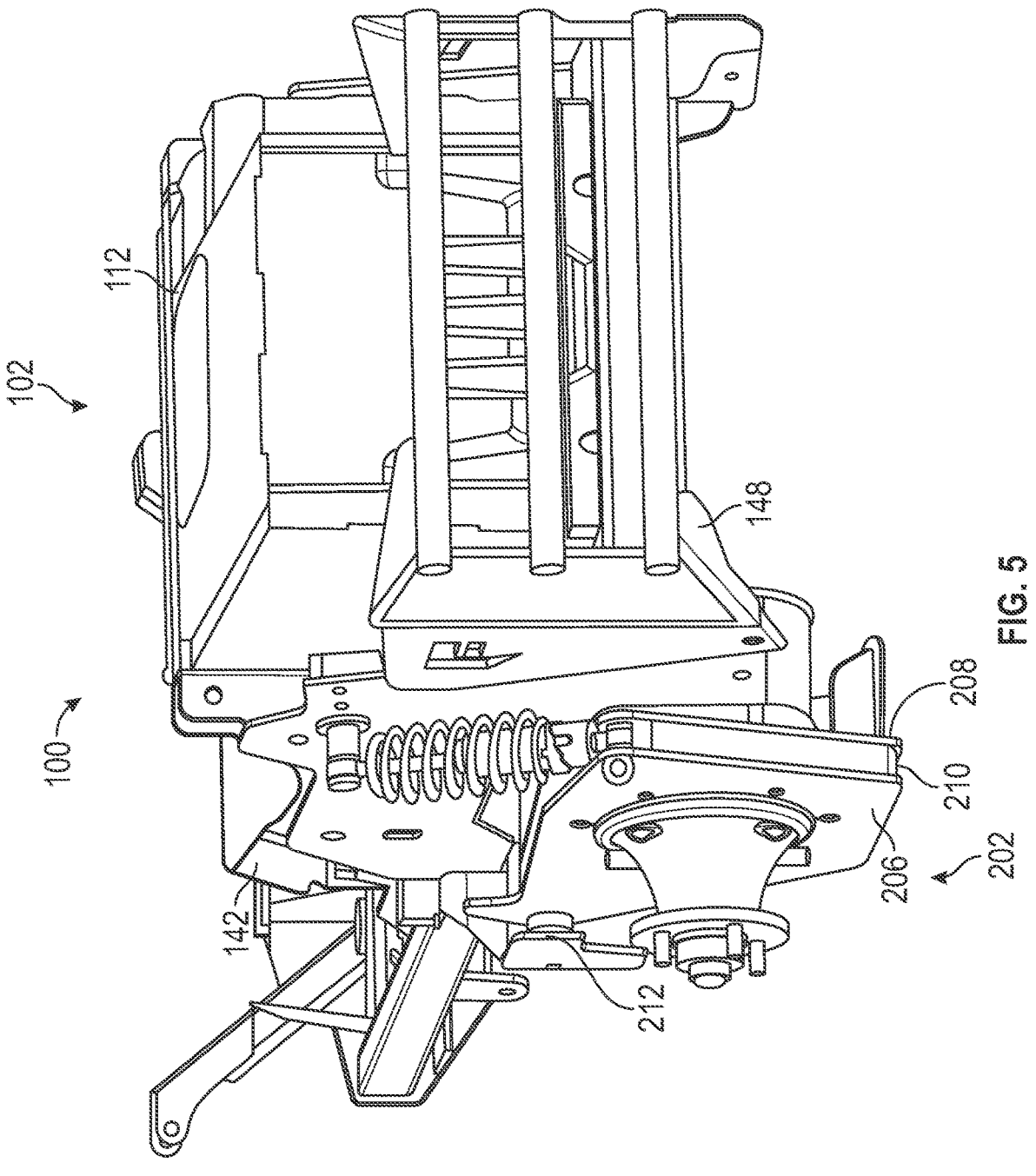
FIG. 5 is a rear perspective view of the chassis of FIG. 2, depicting a mounting assembly for the rear suspension system of FIG. 3.

The rear suspension cradles 202, 204 are formed by a multi-panel construction having a generally trapezoidal shape. For example, and as depicted in FIG. 5, the rear suspension cradle 202 can include a first panel 206, a second panel 208, and a spacer plate 210 positioned between and coupling the first panel 206 and the second panel 208 together. In some examples, the first panel 206 and the second panel 208 are made from aluminum or steel that is laser-cut, cast, stamped, machined, or otherwise formed into shape.

The first panel 206 and second panel 208 can each be formed with a series of mounting features that allow the coupling of the rear suspension cradles 202, 204 to the chassis 102. For example, a first end of the rear suspension cradles 202, 204 can include an axle passage 212. The axle passage 212 can be formed through each of the first panel 206 and the second panel 208 to receive a mounting axle or shaft 214. The mounting axle 214 can be supported by one or more brackets 216 that are rigidly coupled to the crossbeam 134, and creates a rotatable coupling between the rear suspension cradle 202, 204 and the crossbeam 134. In some embodiments, the mounting axle 214 extends approximately parallel to the crossbeam 134, such that rear suspension cradles 202, 204 are each configured to rotate about an axis offset from but parallel to the crossbeam 134. In some examples one or both of the first panel 206 and the second panel 208 further support an ear 218 that extends upwardly beyond the axle passage 212. The ear 218 can receive a spring or other shock absorbing device to further reduce the transmission of changing terrain to a user positioned within the operator seat 110. In some examples, the ear 218 can also provide a rotational stop that interacts with the bracket 216 or crossbar 134 to prevent further rotation of the rear suspension cradle 202, 204 about the mounting axle 214. In some examples, the ear 218 can receive a link to maintain a cutting height of the deck assembly 108 above the surface to be cut as the location of the suspension cradles 202, 204 changes.

Figure 8:
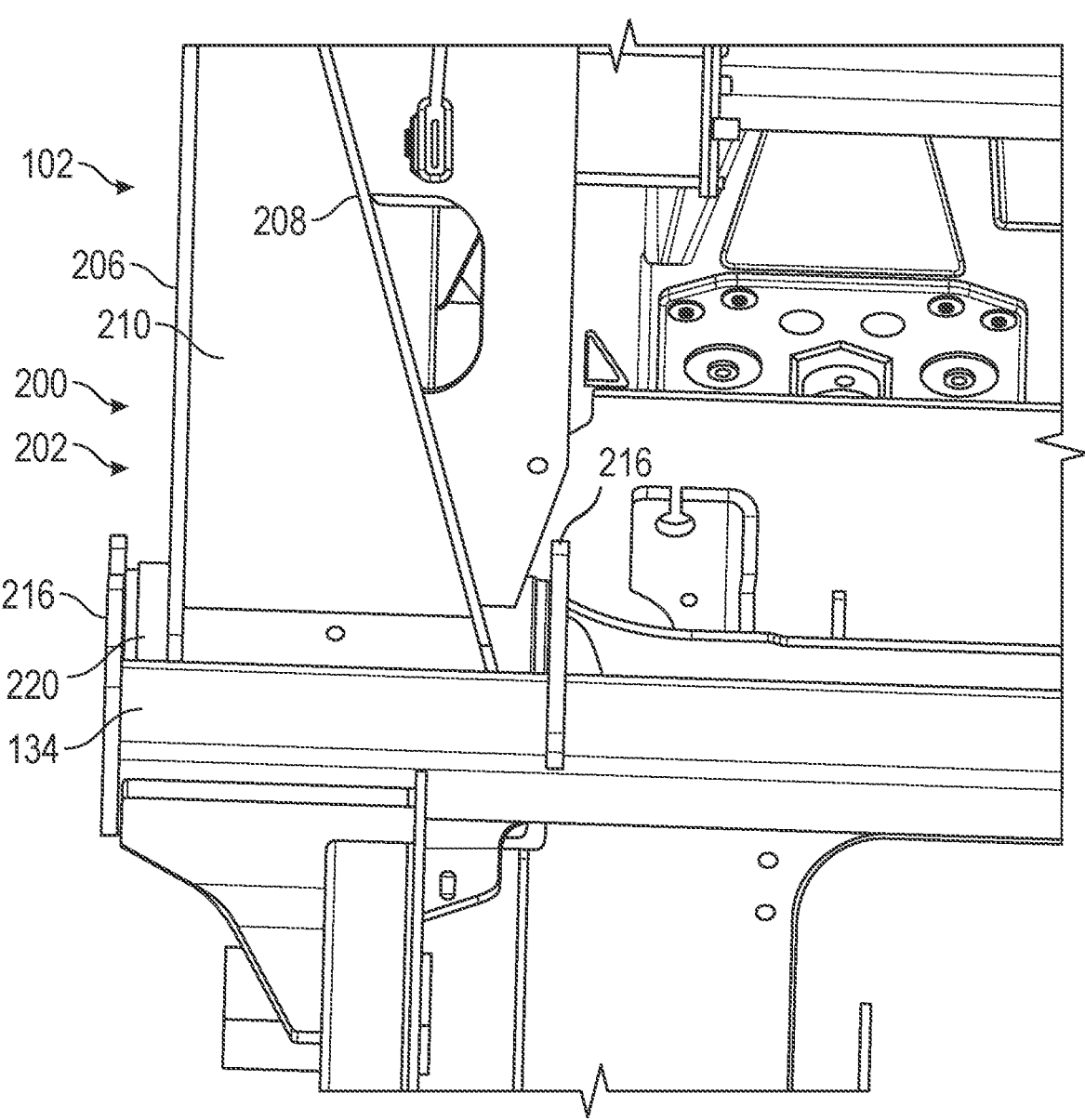
FIG. 8 is a bottom view of a mounting connection depicting the coupling formed between the first rear suspen-sion cradle of FIG. 7 and the chassis.

The coupling between the first end of the rear suspension cradle 202 and the crossbeam 134 is shown in additional detail in FIG. 8. In some examples, the brackets 216 include cylindrical bosses 220 that extend inward to receive and secure a portion of the mounting axle 214. In some examples, the cylindrical bosses 220 can receive and secure one or more bearings and/or grease that allow easier rotation of the rear suspension cradle 202, 204 about the mounting axle 214. The cylindrical bosses 220 can also help to define a portion of the axis X-X that extends approximately parallel to the crossbeam 134.

Figure 6:
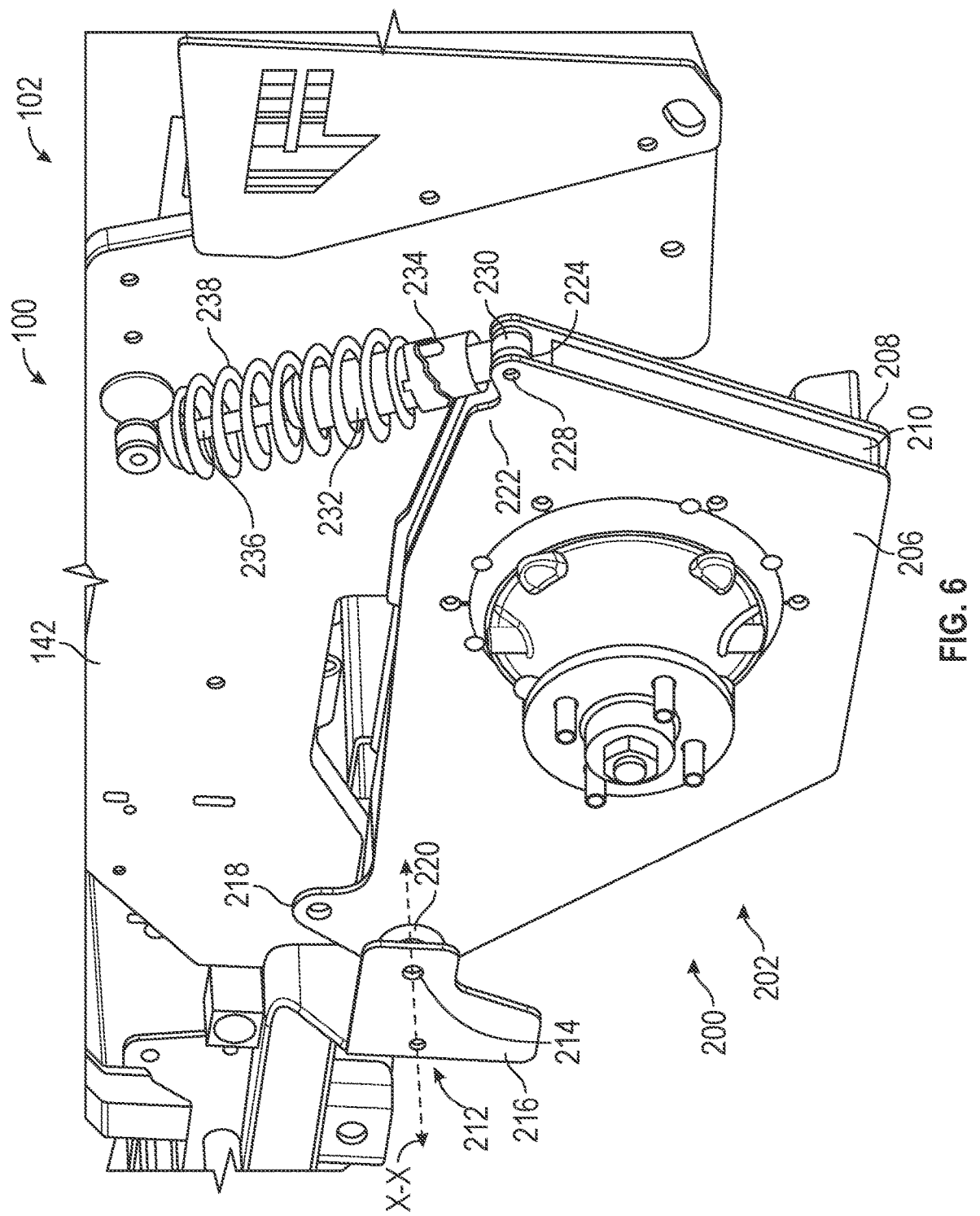
FIG. 6 is a detailed view of a first rear suspension cradle of the rear suspension system of FIG. 3.

The second end of the rear suspension cradle 202, 204 includes a notch and wing assembly that is arranged to facilitate a second coupling between the rear suspension cradle 202, 204 and the chassis 102. As depicted in FIG. 6, for example, each of the first panel 206 and the second panel 208 includes a notch 222 that is formed in a top section of the panels 206, 208. As depicted, the notch 222 is a concave segment. A wing 224 extends outwardly away from the notch 222 to form a distal end of the panel 206, 208. The wing 224 includes a hole 226 that is configured to receive a pin 228 for coupling the rear suspension cradle 202, 204 to a second shock absorbing assembly 230.

The second shock absorbing assembly 230 can include a spring and damper assembly that is configured to oppose rotation of the rear suspension cradle 202 in each direction. As depicted in FIG. 6, the damper 232 is a dashpot-style damper including a body 234 and a piston 236. The body 234 is positioned near the notch and wing assembly, and can be received at least partially within the recess defined by the notch 222. As depicted in FIG. 6, each of the body 234 and piston 236 are configured to be rotatably coupled to different components. The body 234 can be coupled to the wing 224 of the rear suspension cradle 202, 204 using the pin 228. The piston 236 can be coupled to the side panel 142, 144 of the rear frame 130 of the chassis 102. A spring 238 is received around and extends around a portion of each of the body 234 and the piston 236. In some embodiments, the damper 232 and the spring 238 are arranged in series.

The spring and damper assembly oppose motion of the rear suspension cradle 202 and dissipate energy imparted on the rear drive wheels 106, which reduces impacts felt through the operator seat 110 and improves ride quality. For example, if the rear suspension cradle 202 shown in FIG. 6 was rotated clockwise about the axis X-X defined by the mounting axle 214, the tension on the spring 238 will increase, urging the rear suspension cradle 202 back toward the home position. Simultaneously, fluid within the body 234 of the damper 232 opposes the movement of the piston 236 and dissipates some of the energy imparted onto the rear suspension cradle 202. Together, the spring 238 and damper 232 absorb and dissipate some of the shock forces. Likewise, if a counter-clockwise force is imparted onto the rear suspension cradle 202 (e.g., from hitting a pothole or bump), the rear suspension cradle 202 begins to rotate about the mounting axle 214. The spring 238 compresses, and pushes the rear suspension cradle 202 away, toward the home position. Simultaneously, movement of the piston 236 within the body 234 of the damper 232 is opposed by fluid within the body 234, which slows down and reduces the energy transmitted into the rear suspension cradle 202. Together, the spring 238 and damper 232 help to reduce the impact and oscillation that might otherwise be transmitted through to the operator via the operator seat 110.

In some examples, the second shock absorbing assemblies that support the rear suspension cradles 202, 204 can be configured to provide a variable force that can adjust the range of motion of the rear suspension cradles 202, 204. For example, the damper 232 can be a gas spring or pneumatic cylinder configured to be operated at different pressure ranges. Accordingly, the amount of rotation of the rear suspension cradles 202, 204 relative to the crossbeam 134 can be adjusted based upon a type of surface to be mowed or traveled over by the ZTR 100. For example, mowing a very low-cut surface that requires precision (e.g., a putting surface on a golf course, etc.) can be best executed with a very tight suspension that will not cause the deck assembly 108 to move significantly when the ZTR 100 travels over small hills and other objects. As the ZTR 100 is likely to travel at lower speeds, the degree of travel of the suspension can be reduced without significantly impacting ride quality.

In contrast, in situations where the ZTR 100 will be traveling at higher speeds and over rougher terrain, the second shock absorbing assemblies can be relaxed to allow greater movement of the rear suspension cradles 202, 204 relative to the crossbeam 134. Gas can be removed or depressurized from the dampers 232, which will then allow for a greater range of motion. In some examples, the dampers 232 are configured to automatically adjust an amount of gas pressure within the damper 232 based upon a detected velocity of the ZTR 100. Accordingly, at higher speeds, greater ranges of motion for the rear suspension cradles 202, 204 can be permitted, while at lower speeds, the rear suspension cradles 202, 204 will remain more upright and rigid. In some examples, the amount of force within the damper can vary between the rear suspension cradles 202, 204. Pressurized gas can be supplied to each of the dampers 232 from one or more electric pumps that are driven by the electric power from the battery assembly 112.

Figure 7:
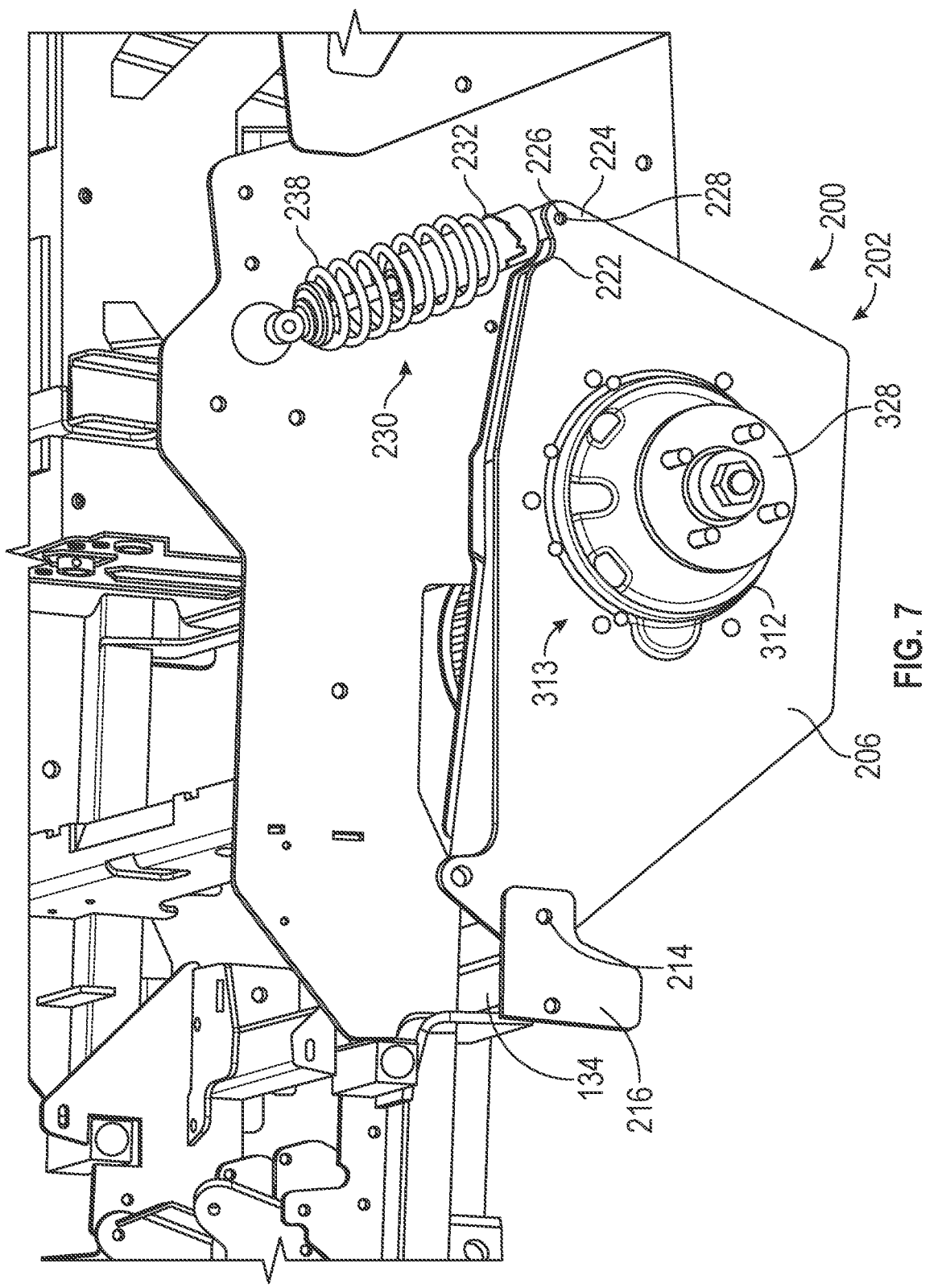
FIG. 7 is a top perspective view of the first rear suspension cradle of FIG. 6.
Figure 9:
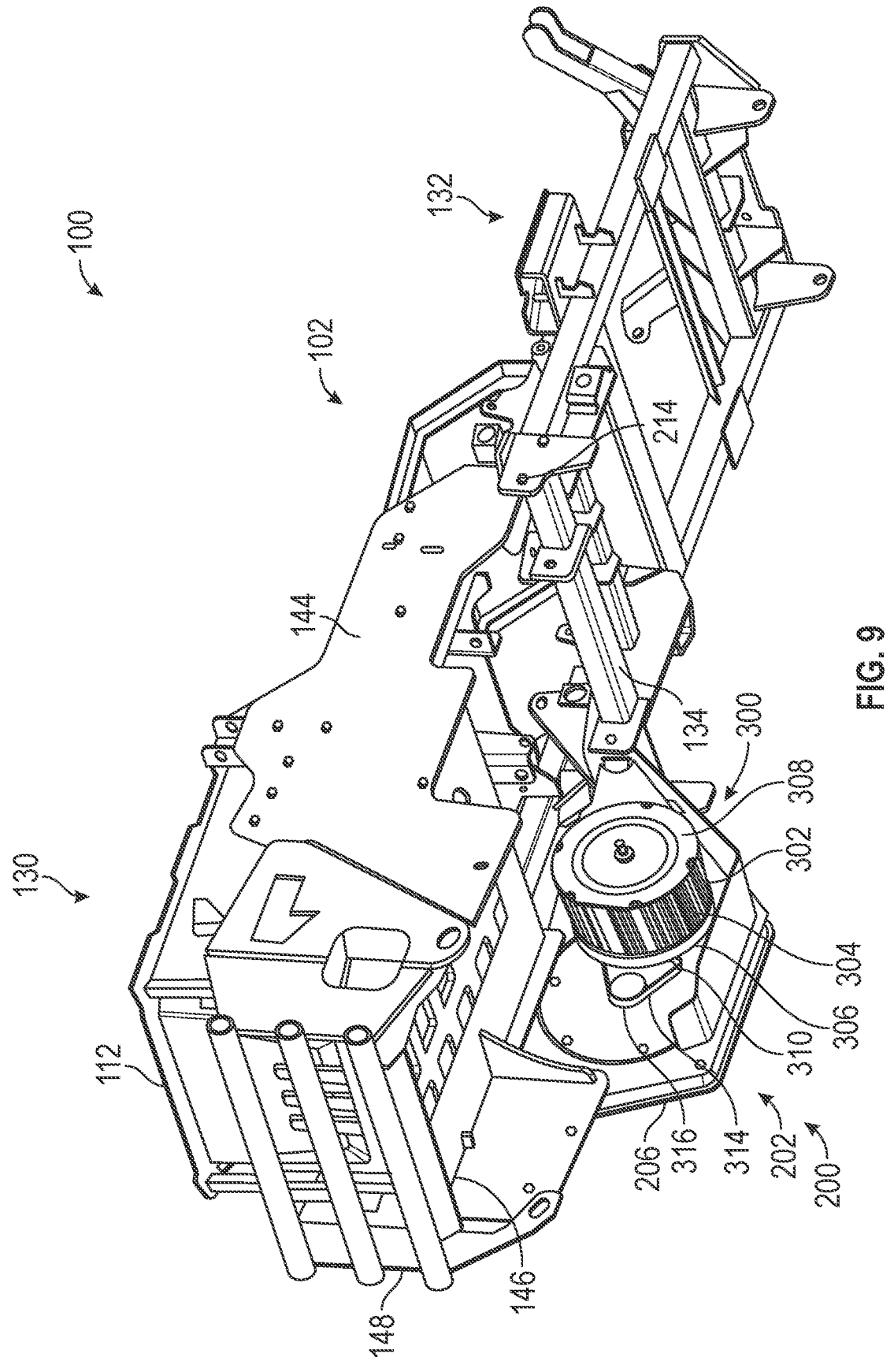
FIG. 9 is a bottom perspective view of the chassis of FIG. 2, depicting a motor assembly supported by the first rear suspension cradle of FIG. 6.
Figure 10:
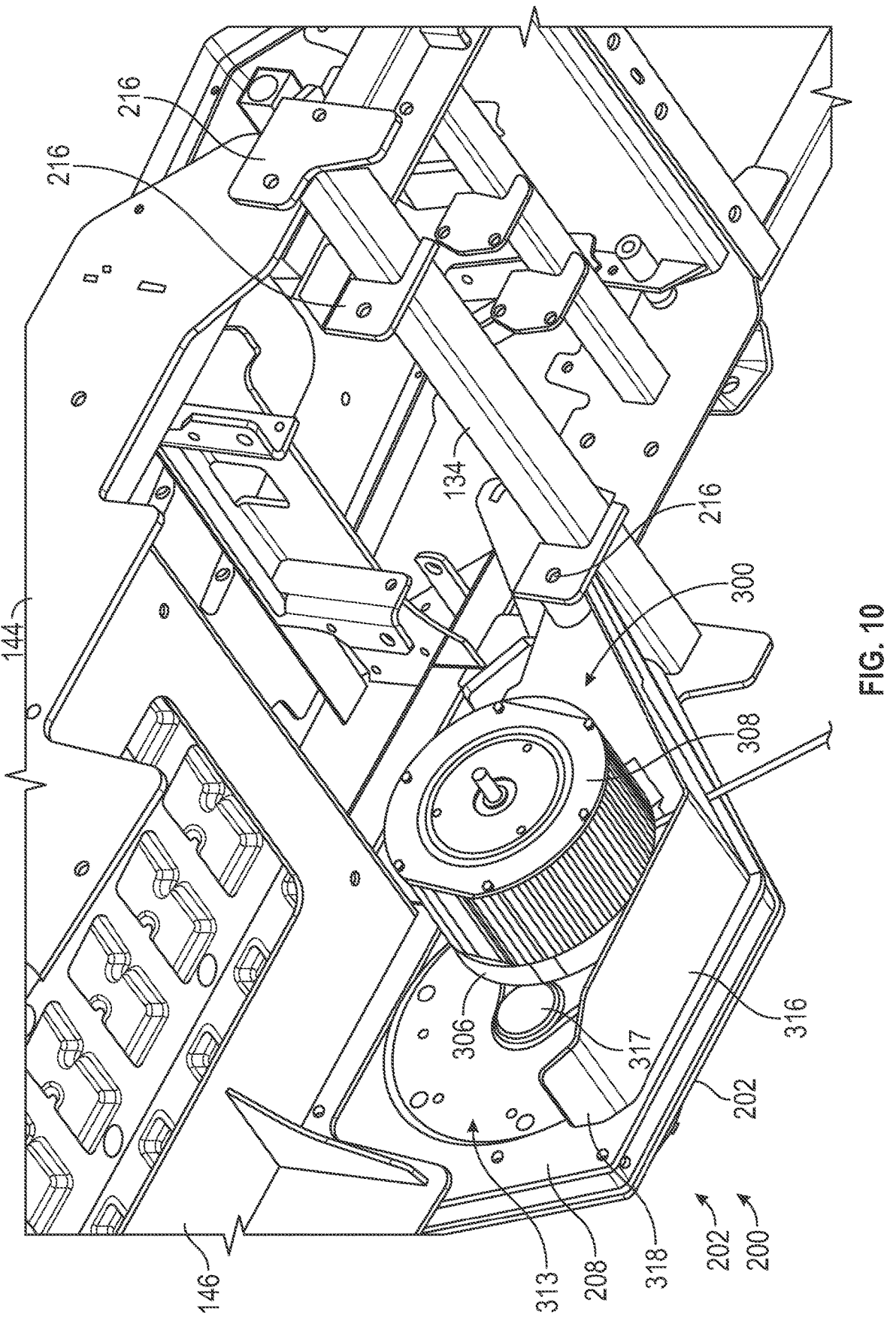
FIG. 10 is a bottom perspective view of the chassis of FIG. 2, depicting the motor assembly of FIG. 9 in additional detail.
Figure 11:
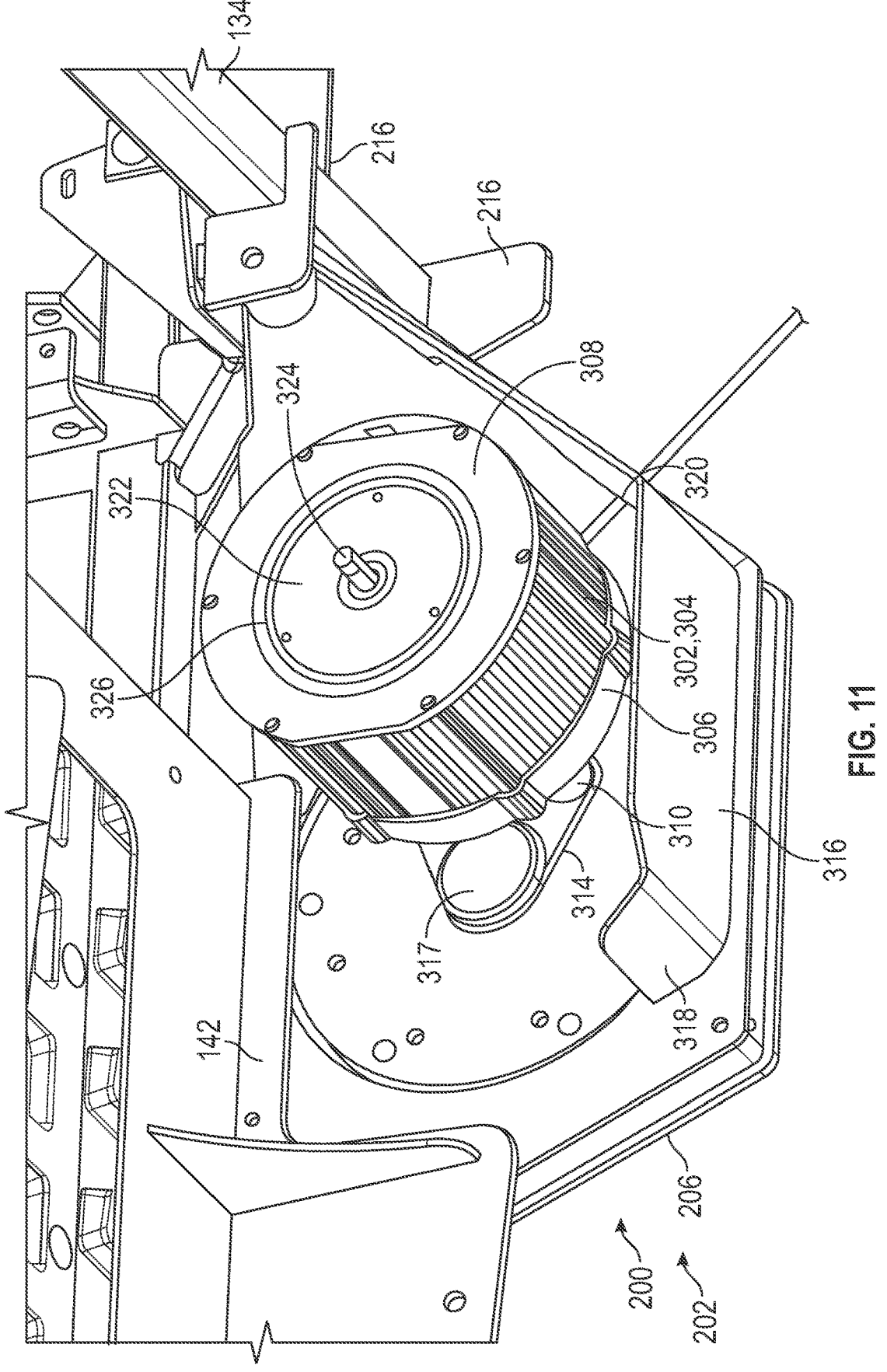
FIG. 11 is a detailed view of the motor assembly of FIG. 9.

Referring to FIGS. 9-11, each of the rear suspension cradles 202, 204 receives and supports an independent electric motor assembly 300. The electric motor assembly 300 can be a traction motor that generally includes a motor body 302 that receives and supports a stator and rotor assembly. The motor body 302 includes a series of ribs 304 that undulate about the outer surface of the motor body 302. A cover plate 306 is positioned on one end of the motor body 302, while a rear plate 308 is positioned on an opposite side of the motor body 302. In some examples, the electric motor assembly 300 is an induction motor that includes a series of copper coils received within the motor body 302 to drive the rotor to impart motion onto a drive shaft 310 extending forward from the cover plate 306. In some examples, the drive shaft 310 is directly coupled to an axle 312 that is supported by the rear suspension cradle 202 or 204. In other examples, the drive shaft 310 is mechanically coupled to the axle 312 using a belt 314 that drives a pulley 317. Rotation of the drive shaft 310 drives the belt 314, which in turn rotates the pulley 317 and axle 312. In some examples and as shown in FIG. 7, the axle 312 is formed as a spindle assembly 313 that is mounted to the first panel 206.

The electric motor assembly 300 can be received within a pocket formed laterally inwardly from the second panel 208 of the rear suspension cradle 202, 204. The pocket can be defined, in part, by an interior panel 316 that extends inwardly away from the second panel 208 of the rear suspension cradle 202, 204. In some examples, the interior panel 316 extends away from a location adjacent the bracket 216 downward, along or adjacent a perimeter of the second panel 208, toward a bottom of the second panel 208. The interior panel 316 can then extend along a bottom of the second panel 208, below the cover plate 306 and drive shaft 310 of the electric motor assembly 300. A lip 318 can extend upward, such that a trough is formed below the electric motor assembly 300. The trough can be used to catch and capture hydraulic fluids (e.g., oil, grease, etc.) that may drip downward from the electric motor assembly 300. In some examples, an absorbent pad can be positioned within the trough to trap fluids escaping from the electric motor assembly 300. The trough can also serve to protect the electric motor assembly 300 from debris that might otherwise be directed toward the electric motor assembly 300 during a mowing process. In some examples, an aperture 320 is formed within the interior panel 316 to help route a wire away from the motor assembly toward the battery assembly 112. Accordingly, a wired cable connection can be made between the battery assembly 112 and the electric motor assembly 300. In some examples, two wires can be passed through the aperture 320, one to couple the electric motor assembly 300 to the battery assembly 112, and another to couple the electric motor assembly to a controller 154 on a controller tray 152.

In some embodiments, the battery assembly 112 is positioned laterally between the electric motor assemblies 300 (see, e.g., FIGS. 2 and 4). For example, a front side 301 of the battery assembly 112 or the battery receptacle 150 extends laterally (e.g., top-to-bottom from the perspective of FIG. 4 or a parallel to a longitudinal direction of the crossbeam 134) and is arranged generally laterally between the electric motor assemblies 300. In some embodiments, the battery assembly 112 is arranged laterally between or bounded by two planes that extend parallel to the second panels 208. In some embodiments, the front side 301 of the battery assembly 112 or the battery receptacle 150 may be longitudinally aligned with the motor body 302 of the electric motor assembly 300. That is, a plane extending parallel to the front side 301 of the battery assembly 112 or the battery receptacle 150 intersects with the motor body 302 of the electric motor assembly 300 (see, e.g., FIG. 4). In general, the battery assembly 112 is arranged vertically (e.g., in a direction perpendicular to a ground on which the ZTR 10 travels) above the electric motor assemblies 300.

As depicted in FIG. 11, the cover plate 306 is offset laterally inwardly (e.g., toward a center of the ZTR 100) from the second panel 208 and inwardly from a side panel 142, 144, such that rotation of the rear suspension cradle 202, 204 relative to the crossbeam 134 will not cause the motor body 302 to interfere with the side panel 142, 144.

Each rear suspension cradle 202, 204 and electric motor assembly 300 can also be equipped with a brake assembly 322. As depicted in FIG. 11, a stub shaft 324 extends inwardly, away from and through the rear plate 308. The stub shaft 324 is coupled to the rotor of the electric motor assembly 302, and is configured to be engaged by a brake 326. The brake 326 can be a spring-applied, electrically released brake that can engage and restrict rotation of the stub shaft 324 to stop the electric motor assembly 300 from driving the ZTR 10. In some examples, a mechanical parking brake can be coupled to a disk 328 of the spindle assembly 313 (see FIG. 7). The parking brake can engage the disk 328 to selectively prevent rotation of the spindle 313, which blocks rotation of the rear drive wheels 106 of the ZTR 100.

Using the above-provided description, a ZTR 100 can be operated in an improved manner that provides a comfortable operator riding experience without sacrificing cut quality. The independent rear cradle suspension provides a smoother ride that transmits less force through the seat of the ZTR 100, which in turn reduces the amount of force passed through to the operator seated on the ZTR 100. The high precision provided by electric traction motors can enable the ZTR 100 to perform tight maneuvers to address different obstacles in a lawn, while also allowing for customization and optimization to configure the ZTR 100 for specific mowing tasks. The rotatable mounting of the rear suspension cradles can also prevent or limit wobble of the rear drive wheels relative to the chassis 102.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the suspension assembly 200 as shown in the various exemplary embodiments is illustrative only. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A zero-turn radius lawnmower comprising:
   a rear frame including a first side panel, a second side panel, and a base panel, the first side panel and the second side panel being positioned on opposite sides of the base panel and together defining a battery receptacle for receiving a battery pack;
   a crossbeam coupled to and extending between the first side panel and the second side panel;

a subframe coupled to the crossbeam, wherein the subframe supports a mower deck and at least two casters;
   a first rear suspension cradle directly and rotatably coupled to the crossbeam on a first end and movably coupled to the first side panel on a second end, the first rear suspension cradle supporting a first electric motor configured to rotate a first drive wheel supported by the first rear suspension cradle, wherein the first electric motor includes a drive shaft extending outward from a first end of a motor housing of the first electric motor and a stub shaft extending outward from a second end of the motor housing, opposite the first end; and
   a second rear suspension cradle directly and rotatably coupled to the crossbeam on a first end and movably coupled to the second side panel on a second end, the second rear suspension cradle supporting a second electric motor configured to rotate a second drive wheel supported by the second rear suspension cradle;
   wherein each of the first electric motor and the second electric motor is coupled to the battery pack, and wherein each of the first rear suspension cradle and the second rear suspension cradle is independently rotatable relative to the rear frame.

2. The zero-turn radius lawnmower of claim 1, wherein the second end of the first rear suspension cradle is movably coupled to the first side panel using a first shock absorbing assembly, and wherein the second end of the second rear suspension cradle is movably coupled to the second side panel using a second shock absorbing assembly.

3. The zero-turn radius lawnmower of claim 2, wherein both of the first shock absorbing assembly and the second shock absorbing assembly each comprise a damper and a spring, wherein the first shock absorbing assembly is configured to oppose rotation of the first rear suspension cradle relative to the rear frame and wherein the second shock absorbing assembly is configured to oppose rotation of the second rear suspension cradle relative to the rear frame.

4. The zero-turn radius lawnmower of claim 3, wherein the damper and the spring of the first shock absorbing assembly are arranged in series.

5. The zero-turn radius lawnmower of claim 4, wherein the damper is a dashpot-style damper.

6. The zero-turn radius lawnmower of claim 2, wherein the first shock absorbing assembly is a gas spring-style damper.

7. The zero-turn radius lawnmower of claim 1, wherein the first rear suspension cradle is formed by two parallel plates spaced apart from one another and rigidly coupled together.

8. The zero-turn radius lawnmower of claim 7, wherein the first rear suspension cradle is rotatably coupled to the crossbeam using an axle that extends through each of the two parallel plates.

9. The zero-turn radius lawnmower of claim 1, wherein the drive shaft is coupled to the first drive wheel through a belt-driven spindle assembly mounted on an outer surface of the first rear suspension cradle.

10. A zero-turn radius lawnmower comprising:
   a rear frame defining a battery receptacle for receiving a battery pack;
   a crossbeam coupled to the rear frame;
   a subframe coupled to the crossbeam, wherein the subframe supports a mower deck and at least two casters, the mower deck including at least two deck motors to separately drive blades;
   a first rear suspension cradle including a first end rotatably coupled to the crossbeam at a pivot axis and a second end movably coupled to a first side of the rear frame, the first rear suspension cradle supporting a first electric motor configured to rotate a first drive wheel supported by the first rear suspension cradle, wherein the first rear suspension cradle includes a first plate and a second plate that are rigidly coupled together, and wherein the first rear suspension cradle includes an interior panel that extends along a bottom of the second plate to form a trough below a front end of the first electric motor; and a second rear suspension cradle including a first end rotatably coupled to the crossbeam at the pivot axis and a second end movably coupled to a second side of the rear frame, the second rear suspension cradle supporting a second electric motor configured to rotate a second drive wheel supported by the second rear suspension cradle;

wherein each of the at least two deck motors, the first electric motor, and the second electric motor is coupled to the battery pack, and wherein each of the first rear suspension cradle and the second rear suspension cradle is independently rotatable relative to the rear frame.

11. The zero-turn radius lawnmower of claim 10, wherein the second end of the first rear suspension cradle is movably coupled to the rear frame using a first shock absorber, and wherein the second end of the second rear suspension cradle is movably coupled to the rear frame using a second shock absorber.

12. The zero-turn radius lawnmower of claim 11, wherein each of the first shock absorber and the second shock absorber each comprises a damper and a spring arranged in series.

13. The zero-turn radius lawnmower of claim 10, wherein each of the first electric motor, the second electric motor, and the at least two deck motors includes a separate and dedicated controller.

14. A zero-turn radius lawnmower comprising:

a rear frame defining a battery receptacle for receiving a battery pack;

a crossbeam coupled to the rear frame;

a subframe coupled to the crossbeam, wherein the subframe supports a mower deck and at least two casters;

a first rear suspension cradle including a first end directly and rotatably coupled to the crossbeam at a pivot axis and movably coupled to a first side of the rear frame on a second end, the first rear suspension cradle supporting a first electric motor configured to rotate a first drive wheel supported by the first rear suspension cradle, wherein the first rear suspension cradle includes a first plate and a second plate that are rigidly coupled together, and wherein the first rear suspension cradle includes an interior panel that extends along a bottom of the second plate to form a trough below a front end of the first electric motor; and a second rear suspension cradle including a first end directly and rotatably coupled to the crossbeam at the pivot axis and movably coupled to a second side of the rear frame on a second end, the second rear suspension cradle supporting a second electric motor configured to rotate a second drive wheel supported by the second rear suspension cradle;

wherein the first electric motor and the second electric motor are coupled to the battery pack and the battery pack is positioned laterally between the first electric motor and the second electric motor, and wherein each of the first rear suspension cradle and the second rear suspension cradle is independently rotatable relative to the rear frame.

15. The zero-turn radius lawnmower of claim 14, wherein the second end of the first rear suspension cradle is movably coupled to the rear frame using a first shock absorber, and wherein the second end of the second rear suspension cradle is movably coupled to the rear frame using a second shock absorber.

16. The zero-turn radius lawnmower of claim 14, further comprising a plurality of deck motors to separately drive blades, wherein each of the deck motors is coupled to the battery pack.

* * * * *